Patented Nov. 4, 1941

2,261,184

UNITED STATES PATENT OFFICE 2,261,184

PROCESS OF PRODUCING HYDROCARBONS FROM CARBON MONOXIDE AND HYDROGEN

Otto Roelen and Walter Feisst, Oberhausen-Holten, Germany, assignors, by mesne assignments, to Hydrocarbon Synthesis Corporation, Linden, N. J.

No Drawing. Application March 23, 1937, Serial No. 132,595. In Germany April 1, 1936

5 Claims. (Cl. 260—449)

This invention relates to processes for reacting carbon monoxide and hydrogen, and more particularly to "benzine" synthesis in the presence of catalysts deposited on carrier substances.

It is an object of this invention to provide improved catalytic materials, and to utilize such improved catalytic materials in processes for reacting carbon monoxide and hydrogen.

In large scale "benzine" synthesis from carbon monoxide and hydrogen the catalysts employed are metals of the iron group (iron, cobalt, nickel) whose active constituents have been precipitated onto kieselguhr. Certain difficulties have been experienced in the production of such catalysts, as the kieselguhr used as carrier mass when brought into contact with acidic and alkaline reagents gives off soluble constituents which have an extremely prejudicial action on the catalytic substance.

Thus for example when kieselguhr is added to the alkaline precipitating solution for the metal catalysts a part of the silicic acid of the kieselguhr dissolves in the form of alkali silicate, and reacts with the heavy-metal salts to form insoluble heavy-metal silicates which cannot be reduced to metal and thus prejudicially affect the activity of the catalyst.

Therefore care should be taken that none of the disturbing constituents dissolve out from the carrier mass. This can be prevented when kieselguhr or powdered asbestos is used by reducing as far as possible the period of contact with the alkaline precipitating solution, and by adding the carrier material containing silicate to the alkaline solution only when the precipitation of the catalytic metals has completely, or almost completely, ceased and the solution is no longer strongly alkaline.

With special advantage carrier materials are employed which have been rendered insoluble, by heating to incandescence.

The catalysts precipitated on carrier materials such as kieselguhr prepared according to the method of this invention give normal yields in the conversion of mixtures of carbon monoxide and hydrogen into liquid hydrocarbons at the low reaction temperature of 180–185° C. These catalysts can be regenerated by treatment with hydrogen in the synthesis furnace itself.

The carrier materials can be produced either artificially or by a suitable treatment of minerals occurring in nature. Insoluble oxides may be produced for example by the decomposition by heat treatment of suitable salts such as the nitrates or the ammonium salts of the heavy-metal oxyacids. The oxides so produced can be rendered still less soluble by further heat treatment; for example, a suitable aluminium oxide insoluble in acid is produced by the thermal decomposition of aluminium nitrate. A suitable chromium oxide may be obtained for example by heating ammonium bichromate. In this case it is advisable to reduce the solubility of the chromic oxide by further heating the chromic oxide first obtained.

In order to obtain a very fine distribution of the carrier materials, they may be mixed with finely divided organic substances such as woodpulp, cellulose and the like, and then the organic substances can be burned out in order at the same time to obtain fine distribution and conversion to the insoluble condition.

The carrier materials thus produced are generally not completely insoluble in alkaline solutions, and the alkaline compounds produced likewise react with the metal catalysts to produce heavy-metal compounds which are insoluble and cannot be reduced to metal, and which may considerably affect the activity of the catalysts and even lead to the formation of a completely inactive material.

It is therefore advisable even when using such carrier materials for the purpose of avoiding the damage to the catalysts which was referred to above, to place the carrier masses into the conversion vessel only when the precipitation of the catalytically active metals has almost come to an end, so that the precipitating solution has no longer a strongly alkaline reaction.

In the same way as it is necessary to prevent any of the constituents of the carrier mass from dissolving during the precipitation of the catalytically active substances, care must be taken that during the regeneration of the catalysts which have become inactive, no foreign substances enter the solution which contains the catalytic metals; for the catalyst may have subsequently absorbed substances from the vessels or from the contact furnace, for example through the synthesis gas, and these substances may also become dissolved during the regeneration of the spent catalyst and on precipitation may affect the catalyst. Foreign substances may enter into solution during regeneration, as for example from the material of the vessel employed for carrying out this process (either by being mechanically removed or chemically dissolved), or from the chemicals employed during regeneration, such as the nitric acid employed for dissolving the catalysts that have become inactive. Moreover during the regeneration of the catalysts, constituents which were insoluble during the first production of the catalyst may pass into solution from the carrier mass under the possibly more severe conditions involved in the dissolving of the spent catalysts. These noxious impurities are rendered ineffective by removing them from the solution containing the catalytic substances by a suitable precipitation.

It has been found advantageous to precipitate these noxious impurities by first adding a small quantity of the alkaline precipitating agent. After the removal of the first precipitate, for example by filtration, the actual metal catalysts are then precipitated by the further addition of the alkaline precipitating solution. In this case also it is advisable to add to the precipitating mixture the substances to be employed as carrier masses after the precipitation of the metal catalysts is completely or almost completely finished.

We claim:

1. A process for reacting carbon monoxide and hydrogen in the presence of catalysts deposited on carrier substances, comprising pretreating the carrier substances by heating their soluble constituents to incandescence to render the same insoluble, precipitating the catalysts from their salt solutions with alkalinically reacting agents and applying said catalysts to said pretreated carrier substances, whereby to substantially prevent soluble components from entering the solution from which precipitation is effected.

2. A process for reacting carbon monoxide and hydrogen in the presence of catalysts, deposited on carrier substances, comprising pretreating the carrier substances by heating their soluble constituents to incandescence to render the same insoluble, and precipitating the catalysts from their salt solutions with alkalinically reacting agents upon said pretreated carrier substances, whereby to substantially prevent soluble components from entering the solution from which precipitation is effected.

3. A process for reacting carbon monoxide and hydrogen in the presence of catalysts deposited on carrier substances, comprising pretreating the carrier substances by heating their soluble constituents to incandescence to render the same insoluble, and precipitating the catalysts from their salt solutions with alkalinically reacting agents upon said pretreated carrier substances, whereby to substantially prevent soluble components from entering the solution from which precipitation is effected, employing said catalysts in the reaction of carbon monoxide and hydrogen until they display a substantial reduction in activity, treating said catalysts with acid to dissolve out the catalytically active constituents, removing from the acid solution by a preliminary precipitation the constituents that have dissolved out of the carrier mass, precipitating the catalytically active constituents upon the carrier substance, washing and drying the contact substances thus obtained and using them in continuing the reaction of carbon monoxide and hydrogen.

4. A process for converting mixtures of carbon monoxide and hydrogen in the presence of catalysts deposited on carrier substances selected from the group of natural products containing silicon dioxide, comprising pretreating the carrier substances by heating their soluble constituents to incandescence to render the same insoluble, precipitating the catalyst metals from their salt solutions with alkalinically reacting agents, and introducing the pretreated carrier substances into the salt solution before the precipitation ceases.

5. A process for converting mixtures of carbon monoxide and hydrogen in the presence of catalysts deposited on carrier substances selected from the group of natural products containing silicon dioxide, comprising pretreating the carrier substances by heating their soluble constituents to incandescence to render the same insoluble, precipitating the catalyst metals from their salt solutions with alkalinically reacting agents, and introducing the pretreated carrier substances into the salt solution after precipitation has ceased.

OTTO ROELEN.
WALTER FEISST.